(12) United States Patent
Jakobsson et al.

(10) Patent No.: US 10,114,942 B2
(45) Date of Patent: *Oct. 30, 2018

(54) INTERACTIVE CAPTCHA

(71) Applicant: PayPal, Inc., San Jose, CA (US)

(72) Inventors: Bjorn Markus Jakobsson, Portola Valley, CA (US); Jim Roy Palmer, San Jose, CA (US); Gustavo Maldonado, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,086

(22) Filed: Jul. 18, 2017

(65) Prior Publication Data

US 2017/0316200 A1    Nov. 2, 2017

Related U.S. Application Data

(63) Continuation of application No. 15/095,648, filed on Apr. 11, 2016, now Pat. No. 9,710,643, which is a (Continued)

(51) Int. Cl.
*G06F 21/45* (2013.01)
*G06F 21/36* (2013.01)
(Continued)

(52) U.S. Cl.
CPC ............ *G06F 21/45* (2013.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS 5,559,961 A   9/1996 Blonder
6,209,104 B1  3/2001 Jalili
(Continued)

OTHER PUBLICATIONS

Microsoft, "ASIRRA—Microsoft Research", http://research.microsoft.com/en-us/um/redmond/projects/asirra/2013, 2 pgs.

*Primary Examiner* — Christopher Revak
(74) *Attorney, Agent, or Firm* — Haynes and Boone, LLP

(57) ABSTRACT

In response to a user access request, a media object containing a plurality of media components is constructed and transmitted to the user. At least one of the media components has been categorized as having different degrees of relevance to humans from a first culture/geographical location and humans from a second culture/geographical location. The user is prompted to solve a puzzle by selecting one or more of the media components or rearranging a location, size, appearance, or orientation of one or more of the media components. A description of an action performed by the user in response to the prompting is obtained. A determination is made, based on the obtained description of the action performed by the user, whether the user is more likely to be a human from the first culture/geographical location or a machine or a human from outside the first culture/geographical location.

20 Claims, 8 Drawing Sheets

Related U.S. Application Data continuation of application No. 13/174,394, filed on Jun. 30, 2011, now abandoned.

(51) Int. Cl.
    *G06F 3/0486*     (2013.01)
    *G06F 3/0482*     (2013.01)
    *G06F 3/0481*     (2013.01)
    *G06F 9/44*     (2018.01)
    *G06F 3/0484*     (2013.01)
    *G06F 9/451*     (2018.01)

(52) U.S. Cl.
    CPC ...... *G06F 3/04817* (2013.01); *G06F 3/04842* (2013.01); *G06F 9/454* (2018.02); *G06F 21/36* (2013.01)

(56) References Cited

U.S. PATENT DOCUMENTS

| | | | |
|---|---|---|---|
| 7,992,202 B2 | 8/2011 | Won et al. | |
| 8,112,483 B1 * | 2/2012 | Emigh | G06F 21/36 709/206 |
| 8,214,892 B2 | 7/2012 | Cohen et al. | |
| 8,245,277 B2 | 8/2012 | Lazar et al. | |
| 8,346,217 B2 * | 1/2013 | Crawford | H04W 12/06 455/410 |
| 8,347,103 B2 | 1/2013 | Jones et al. | |
| 8,392,975 B1 | 3/2013 | Raghunath | |
| 8,401,522 B2 * | 3/2013 | Crawford | G06F 21/31 455/410 |
| 8,589,694 B2 | 11/2013 | Clark et al. | |
| 8,607,331 B2 | 12/2013 | Sun et al. | |
| 8,650,636 B2 | 2/2014 | Johnson et al. | |
| 8,671,058 B1 | 3/2014 | Isaacs | |
| 8,713,703 B2 | 4/2014 | Fisk et al. | |
| 8,918,851 B1 | 12/2014 | Iannammico | |
| 9,319,419 B2 | 4/2016 | Sprague et al. | |
| 9,397,841 B2 * | 7/2016 | Godse | G06F 21/31 |
| 9,591,035 B2 * | 3/2017 | Kuo | G06F 21/31 |
| 9,710,643 B2 * | 7/2017 | Jakobsson | G06F 21/45 |
| 2008/0146193 A1 | 6/2008 | Bentley et al. | |
| 2009/0113294 A1 | 4/2009 | Sanghavi et al. | |
| 2009/0276839 A1 | 11/2009 | Peneder | |
| 2009/0328163 A1 | 12/2009 | Preece | |
| 2010/0043062 A1 | 2/2010 | Alexander et al. | |
| 2010/0169958 A1 | 7/2010 | Werner et al. | |
| 2010/0306055 A1 | 12/2010 | Kolb | |
| 2011/0166916 A1 * | 7/2011 | Inbar | G06F 3/0481 705/14.4 |
| 2011/0246951 A1 | 10/2011 | Chen | |
| 2012/0222100 A1 * | 8/2012 | Fisk | G06F 21/316 726/7 |
| 2013/0036461 A1 | 2/2013 | Lowry | |
| 2013/0145441 A1 | 6/2013 | Mujumdar et al. | |
| 2014/0282979 A1 | 9/2014 | Andon | |
| 2014/0325220 A1 | 10/2014 | Tunnell et al. | |
| 2016/0219036 A1 | 7/2016 | Devkar et al. | |

\* cited by examiner

INTERACTIVE CAPTCHA

CROSS-REFERENCE TO RELATED APPLICATIONS

The present application is a continuation application of U.S. patent application Ser. No. 13/174,394 filed on Jun. 30, 2011 and U.S. patent application Ser. No. 15/095,648 filed on Apr. 11, 2016 (issued as U.S. Pat. No. 9,710,643 on Jul. 18, 2017), the disclosures of which are hereby incorporated by reference in their entirety.

TECHNICAL FIELD

The present disclosure generally relates to computer security, more particularly, to a more secure and user friendly CAPTCHA.

RELATED ART

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. As more and more transactions are done online, fraud prevention becomes critical. Among other methods, one method of detecting potential fraud is to check to see if a user is really a human being or a machine. This type of detection is known as CAPTCHA, which stands for "Completely Automated Public Turing Test to tell Computers and Humans Apart."

A conventional CAPTCHA may involve displaying obfuscated words or letters and asking a user to enter the displayed words or letters. Obfuscation of the words or letters is presumed to make the words or letters unrecognizable to a machine, while a human should be able to correctly identify the words or letters with relative ease. However, rapid advances in computer technology has made computers much more capable of solving CAPTCHAs, which means conventional CAPTCHAs may not offer as much reliability as they once did. In addition, traditional CAPTCHAs may be difficult for humans to correctly identify as well, particularly if the display is on a small screen such as a mobile telephone screen. Consequently, a human user could be erroneously classified as a machine, which defeats the purpose of the CAPTCHA.

Therefore, while existing CAPTCHAs have been generally adequate for their intended purposes, they have not been entirely satisfactory in every aspect. It would be advantageous to offer an improve CAPTCHA that is both easy for humans to identify and hard for machines to solve.

SUMMARY

One of the broader forms of the present disclosure involves a method. The method includes: receiving a request from a user; constructing, by a computer processor, a media object that contains a plurality of media components; transmitting the media object to the user; prompting the user to perform a task involving at least a subset of the media components, the task including at least one of the following: selecting each of the media components in the subset according to a predefined sequence; and modifying at least one of the media components in the subset with respect to at least one of its following properties: location, size, appearance, and orientation; obtaining a description of an action performed by the user in response to the prompting; and deciding whether or not to grant the request based on the obtaining.

Another one of the broader forms of the present disclosure involves an apparatus comprising a non-transitory, tangible computer readable storage medium storing a computer program. The computer program has instructions that when executed, perform: receiving a request from a user; constructing a media object that contains a plurality of media components; transmitting the media object to the user; prompting the user to perform a task involving at least a subset of the media components, the task including at least one of the following: selecting each of the media components in the subset according to a predefined sequence; and modifying at least one of the media components in the subset with respect to at least one of its following properties: location, size, appearance, and orientation; obtaining a description of an action performed by the user in response to the prompting; and deciding whether or not to grant the request based on the obtaining.

Yet another one of the broader forms of the present disclosure involves a system. The system involves: means for receiving a request from a user; means for constructing a media object that contains a plurality of media components; means for transmitting the media object to the user; means for prompting the user to perform a task involving at least a subset of the media components, the task including at least one of the following: selecting each of the media components in the subset according to a predefined sequence; and modifying at least one of the media components in the subset with respect to at least one of its following properties: location, size, appearance, and orientation; means for obtaining a description of an action performed by the user after the user is prompted; and means for deciding whether or not to grant the request based on the description obtained.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Figure 1:
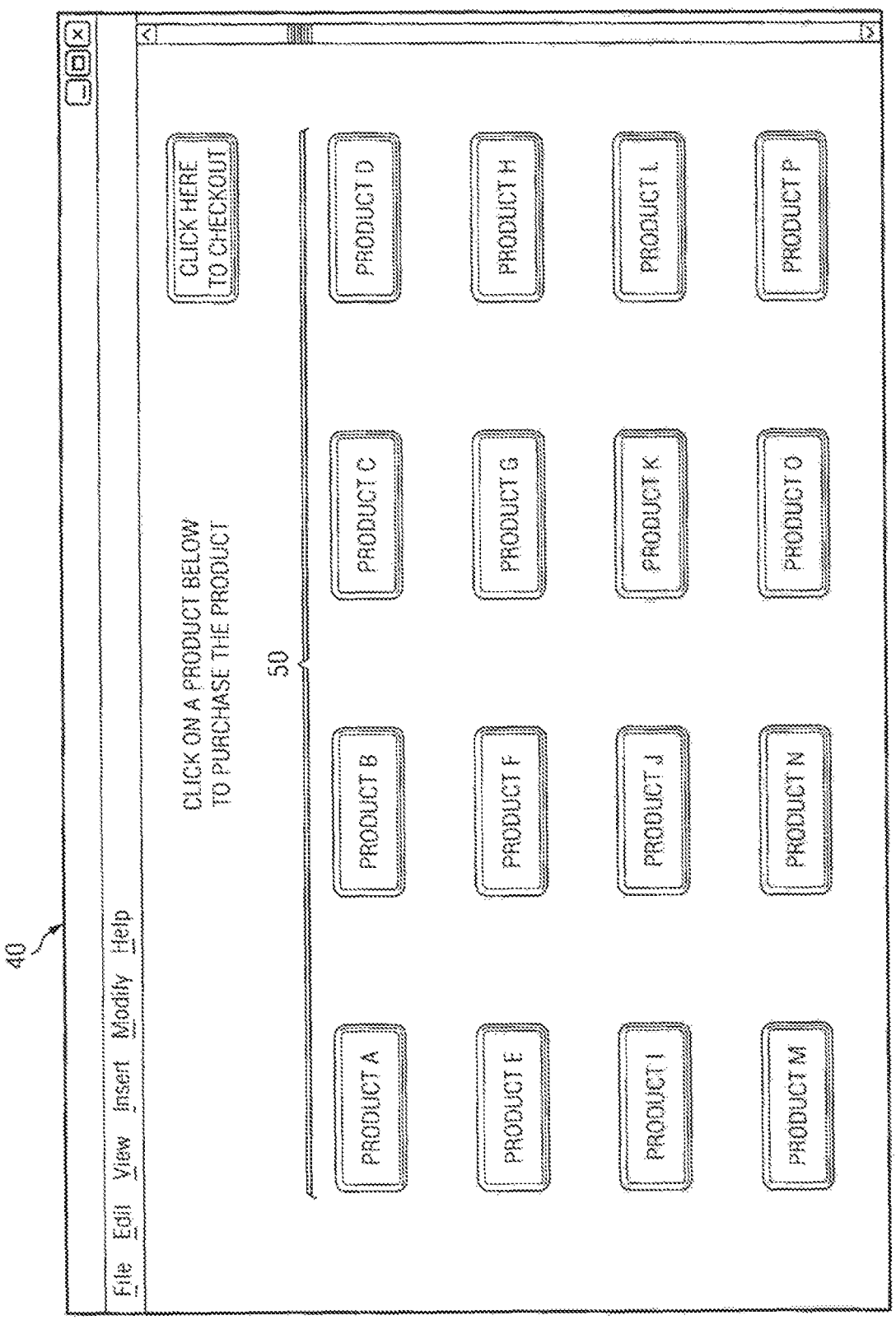
FIG. 1 illustrates a simplified example of a user interface for an online shopping site at a production selection phase.
Figure 2:
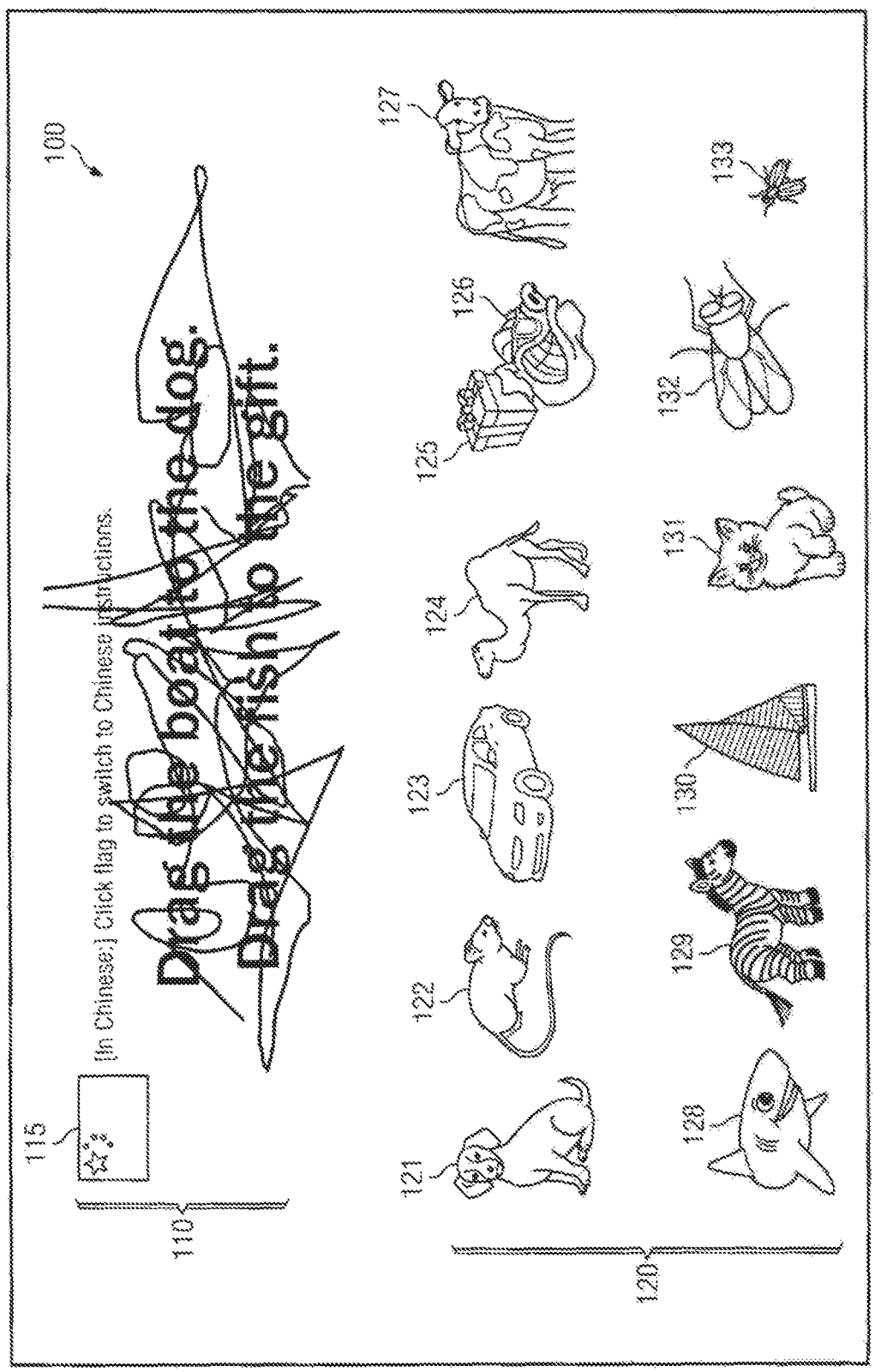
FIG. 2 illustrates an example of a CAPTCHA according to various aspects of the present disclosure.

In online transactions, a server may receive various requests from users. CAPTCHAs are used to determine whether these users are humans or machines. FIGS. 1-2 and the accompanying discussions below describe one example situation in which a CAPTCHA may be used according to various aspects of the present disclosure. Referring to FIG. 1, an example user interface 40 from an online shopping site is illustrated. The online shopping site is engaged in the selling of products (goods), where product or good is used herein to include physical goods, digital goods, services, charitable donations, etc. In an embodiment, the user interface 40 is in the form of a web page. The user interface 40 displays a plurality of objects 50 that each represent a different product. The objects 50 may each contain a button, an icon, a picture, or combinations thereof. In another embodiment, the online shopping site sells products at a physical point of sale, such as a store or kiosk, and a user may select physical products to be scanned at the point of sale.

The products represented by the objects 50 may include physical and tangible goods, including (but not limited to) clothing, electronics, tools, toys, household appliances, books, movies, automotive components, sporting goods, groceries, etc. The products represented by the objects 50 may also include digital goods, which include goods that are stored, delivered, and/or used in an electronic format. As non-limiting examples, digital goods may include electronic-books, digital music files, digital images, digital videos, and virtual items, etc. Similar to physical and tangible goods, digital goods can be bought and sold between interested parties. The buyer of a digital good may receive the purchased digital good through an email attachment, a download, or other suitable mechanisms.

As is illustrated in FIG. 1, the user interface 40 informs a prospective buyer what products are available from the merchant. To initiate the purchasing process, the prospective buyer may click on any one of the objects 50 to add it to the buyer's purchasing queue, which may be in the form of a virtual shopping cart. The prospective buyer may edit the purchasing queue at any time, such as adding or subtracting the quantity of a particular product in the queue or removing a product from the queue altogether. For the sake of simplicity, the details of the purchasing queue are not illustrated herein.

When the user is ready to check out, a request is sent to a server as part of a verification process. The server may be a server for the online shopping site. The server may also be a server for a third party payment platform such as PAYPAL®. To verify the user's identity and to make sure the user is a human user and not a machine, the user is asked to pass a CAPTCHA test, an embodiment of which is illustrated in FIG. 2 as CAPTCHA 100. The CAPTCHA 100 is a picture-based CAPTCHA in an embodiment and may therefore be also referred to as picTCHA. The CAPTCHA 100 contains an instructions object 110. The instructions object 110 displays word-based instructions (for example, instructions in English or another suitable language) that prompt the user to perform one or more particular tasks. As an example, the instructions object 110 illustrated herein prompts the user to perform the following two tasks, "drag the boat to the dog" and "drag the fish to the gift."

The instructions object 110 may be obfuscated to make automated processing of the instructions difficult. In other words, the obfuscation of the instructions object 110 makes it more difficult to be recognized by machines. The obfuscation in the illustrated embodiment is done by drawing random squiggly lines throughout the words of the instructions object 110. In other embodiments, the obfuscation may be done by distorting or warping the words of the instructions object 110, crowding the words together, or otherwise adding more background clutter and noise to the instructions object 110.

The instructions object 110 may also contain instructions for notifying the user that the language of the instructions object 110 may be changed to a different language. For example, the instructions object 110 may contain an image-based link 115 that can alter the displayed language of the instructions object 110. In the embodiment illustrated, the image-based link 115 is a Chinese flag, and the instructions adjacent to the Chinese flag notify the user that the instructions will be displayed in Chinese if the Chinese flag is clicked on. In other embodiments, the image-based link 115 may contain a drop-down menu that can display a plurality of nations' flags (or the names of the nations), and the selection of a particular nation's flag will display the instructions in the language of that nation. In some other alternative embodiments, the language of the instructions object 110 may be automatically adjusted based on retrieved contextual information from the user such as an Internet Protocol (IP) address of the user's computer, the character set of the user's computer, or the previous history of the user. For example, if the IP address of the user's computer indicates that the computer is located in Japan, then the language of the instructions object 110 may be automatically switched to Japanese.

The CAPTCHA 100 also contains a media object 120. The media object 120 includes a plurality of media components, examples of which are illustrated herein as media components 121-133. The media components 121-133 are images of common everyday items, for example things that exist in nature or things that are man-made. In more detail, the media component 121 is a dog; the media component 122 is a mouse; the media component 123 is a car; the media component 124 is a camel; the media component 125 is a gift; the media component 126 is a head of a pig wearing sunglasses; the media component 127 is a cow; the media component 128 is a fish; the media component 129 is a zebra; the media component 130 is a boat; the media component 131 is a cat; the media component 132 is a fly; and the media component 133 is a bug.

Each of these media components 121-133 is easy for a human user to recognize and identify, but they may be more difficult for a machine to identify. Unlike characters or letters, the concept or entity represented by each media component herein may take any number of different forms. For example, the media component 126 is a cartoonized pig's head wearing sunglasses. A human user should have no difficulty recognizing that the media component 126 still represents a pig. However, a machine needs to scour a large database to find images tagged with "pig" that closely match the media component 126. This scouring task may take a long time, after which it may still yield an incorrect result.

At least a subset of the media components 121-133 may be obfuscated to make them even harder to identify by machines. For example, the media components 125-126 are partially overlapping with one another. Thus, they may appear as a single entity for a machine, since there are no clear boundaries separating them. However, to a human user, it is clear that the media components 125-126 represent different items. Other examples of obfuscation techniques (not necessarily illustrated herein) may include:
Making the images fuzzy or out of focus
Reducing the contrast for the images
Adding peculiar coloration to the images
Rotating the images so that they are viewed from peculiar angles Partially hiding one image with another Transforming an image (e.g., making a cow squiggly or rip it up into multiple pieces and putting the pieces back together)

Other suitable obfuscation techniques may apply, but they are not discussed herein for the sake of simplicity. It is also understood that the media components 121-133 need not necessarily be images or items with only visual characteristics. In some embodiments, the media components 121-133 may be video clips and may have audio or tactile characteristics as well.

The media components 121-133 may also have varying levels of abstraction. As an example, an image of a cow may be abstracted as a collection of lines that delineates the head of a cow. In other words, the image of the cow is not taken from any actual pictures of real cows or even caricatures of cows. It can merely be just a rough sketch of a part of a cow, for example a sketch resembling to what a child would draw as a cow. Such abstraction usually does not deter a human user from recognizing that the image indeed represents a cow, but it makes it even harder to be correctly identified by a machine. The media components 121-133 may also have different sizes.

The media components 121-133 may be randomly generated according to certain underlying parameters indicating what the media components may look like. For example, a computer server that performs the generation of the media components 121-133 may have access to a database that stores hundreds or thousands of images (or videos) for each of a plurality of different items, such as thousands of images of dogs, thousands of images of boats, thousands of images of automobiles, thousands of images of cows, etc. The server may receive a command to generate an image of a dog, a boat, an automobile, and a cow. In response, the server may randomly choose one of the images of a dog, a boat, an automobile, and a cow from the thousands of available images.

The user is prompted to manipulate a subset of the media components 121-133 according to the instructions given by the instructions object 110. For example, in the embodiment illustrated herein, the user is supposed to first drag (using a finger or mouse) the boat (media component 130) to the dog (media component 121), and then drag the fish (media component 128) to the gift (media component 125). Once again, a human user should easily recognize these images and will be able to correctly perform the tasks according to the instructions.

The instructions object 110 of the embodiment illustrated herein prompts the user to change the location properties of a subset of the media components by dragging them. In other embodiments, the instructions object 110 may prompt the user to manipulate the media components 121-133 differently. For example, in an alternative embodiment, the user may be asked to change the size of a subset of the media components: the instructions object 110 may read "enlarge the car, and shrink the cat." In another embodiment, the user may be asked to change the orientation of a subset of the media components: the instructions object 110 may read "rotate the cow clockwise by 90 degrees, and rotate the mouse counterclockwise by 180 degrees." In yet another embodiment, the user may be asked to change the appearance of a subset of the media components: the instructions object 110 may read "color the dog with a blue color, and color the zebra with a pink color." In that embodiment, a palette of colors may be displayed, and the user may be able to select, such as by clicking or tapping on a certain color in the palette to assign that color to a particular media component.

In one more embodiment, the user may be asked to identify a subset of media component based on similar classifications: the instructions object 110 may read "click on all the mammals," "click on all things that could be dangerous," "click on all vehicles," "click on the three images that are largest in the real world," or "click on all images that are cartoon characters." The instructions may be specific to a type of user device or more general. For example, if the system knows the user is on a touch screen device, the instructions may ask the user to "tap" on specific objects. A more general instruction may ask the user to "select" specific objects, which may include clicking, tapping, moving a pointer or mouse, etc. In some embodiments, the user may be asked to group images relative to each other: the instructions object 110 may read "drag the image that is eaten to the image that eats it." In other embodiments, the user may be asked to match suites of corporate products: the instructions object 110 may read "click on all characters that interact with Donald Duck."

In another embodiment, the user may be asked to select a subset of the media components 121-133 according to a predefined sequence: the instructions object 110 may read "click on the dog, then click on the fish, then click on the boat, then click on the cow, and finally click on the camel." In yet another embodiment, even the instructions object 110 may contain an image or an item that has visual and/or audio characteristics. For example, the instructions object 110 may contain an image of a dog and instructs the user to click on all the images of the media object 120 that match that image. In some embodiments, the user may be asked to perform two or more of the tasks discussed above concurrently, for example to simultaneously drag the dog to the car (with one finger) and to drag the fish to the boat (with another finger). In some other embodiments, the user may be asked to perform two or more of the tasks discussed above according to a predefined sequence. For example, the user may be asked to first drag the dog to the car, then to click on all the mammals, then to rotate the fish clockwise by 90 degrees, and then to shrink the zebra.

Figure 3:
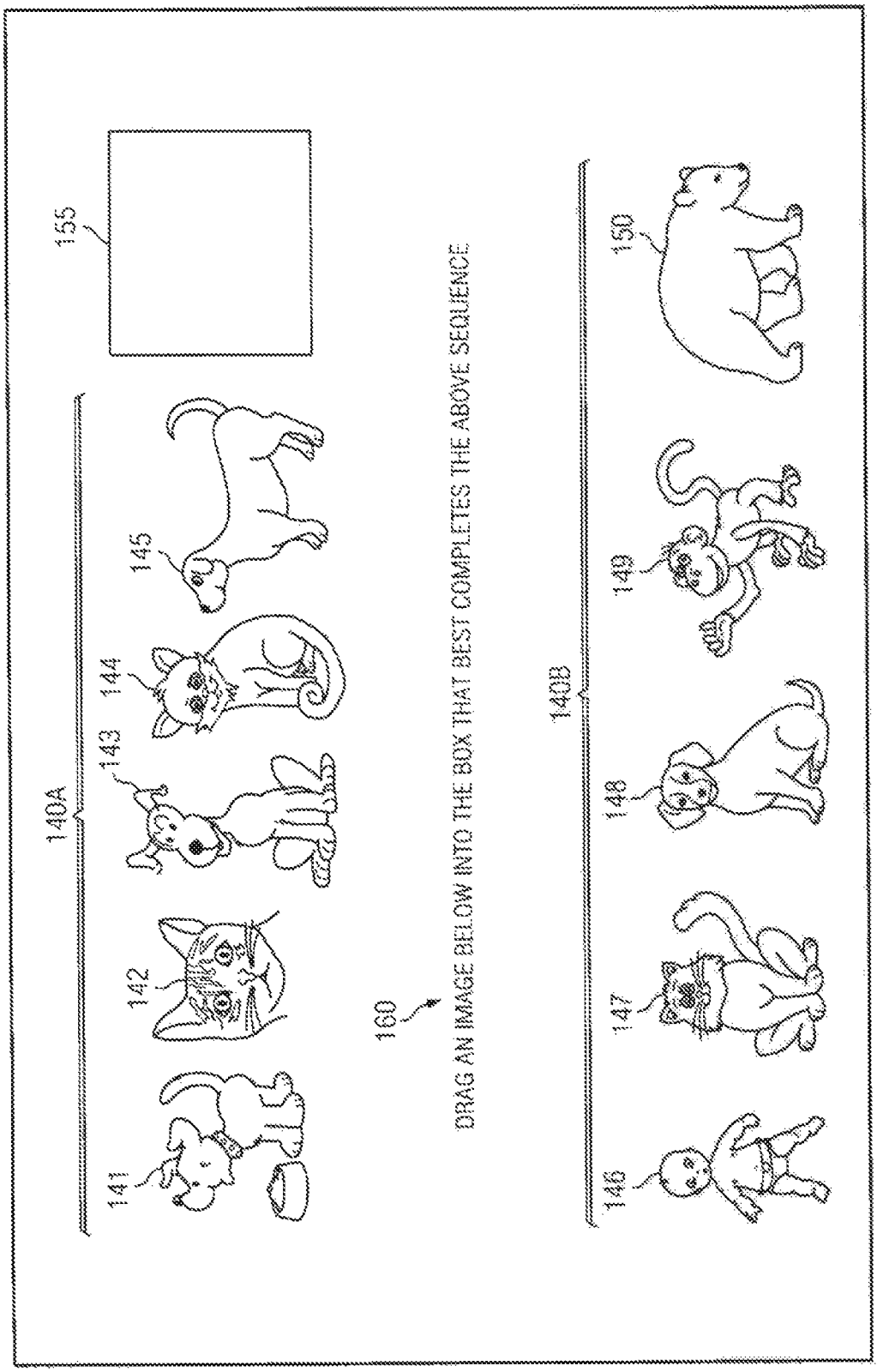
FIGS. 3-7 illustrate additional examples of CAPTCHAs according to other aspects of the present disclosure.

FIGS. 3-7 illustrate additional aspects of the CAPTCHA disclosed herein. According to one aspect of the present disclosure, logic (or a puzzle) is utilized to manipulate media components. Referring to FIG. 3, a media object 140A contains a plurality of media components 141-145, and a media object 140B contains a plurality of media components 146-150. The media components 141, 143, and 145 are images of dogs. The media components 142 and 144 are images of cats. The media components 146-150 are images of a baby, a cat, a dog, a monkey, and a bear, respectively. The media components 141-145 form a sequence. An empty box 155 is placed at the end of the sequence. The box 155 may also be considered a media component.

Interposed between the media objects 140A and 140B is an instructions object 160, which displays a message, "drag an image below into the box that best completes the above sequence." In some embodiments, the instructions object 160 may be obfuscated. To a human user with basic logic reasoning skills, it is apparent that the sequence formed by the media components 141-145 is: dog/cat/dog/cat/dog. In other words, the logic behind the sequence involves cats and dogs alternating with each other. As such, since the last media component 145 in the sequence is a dog, the cat corresponding to media component 147 would best complete the sequence. On the other hand, a machine most likely would not be able to understand the logic behind the sequence, particularly (as in the illustrated embodiment) if the images of the cats are all different from one another, as are the images of the dogs. In that case, it would be difficult for the machine to identify any type of pattern, and thus it would be hard for the machine to solve the logic problem disclosed herein.

It is understood that the puzzle disclosed herein is merely an example, and that other types of puzzles or logic problems may be implemented in alternative embodiments. For example, in an embodiment, a sliding puzzle such as the "gem puzzle" or "game of fifteen" or "mystic square" may be implemented. In such puzzle, the user may be prompted to navigate tiles within a confined area until the tiles are ordered according to a certain sequence (for example, in a numerically ascending sequence). For the sake of simplicity, these additional puzzles are not specifically illustrated herein.

Figure 4:
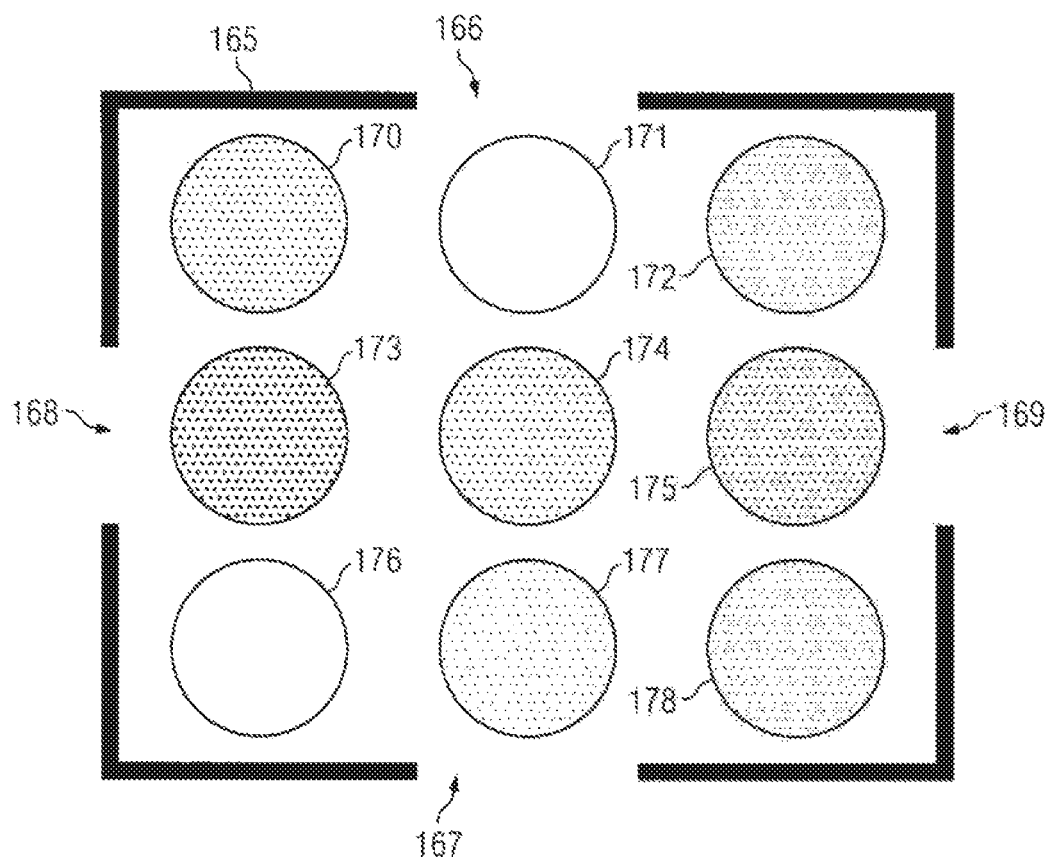
Figure 5:
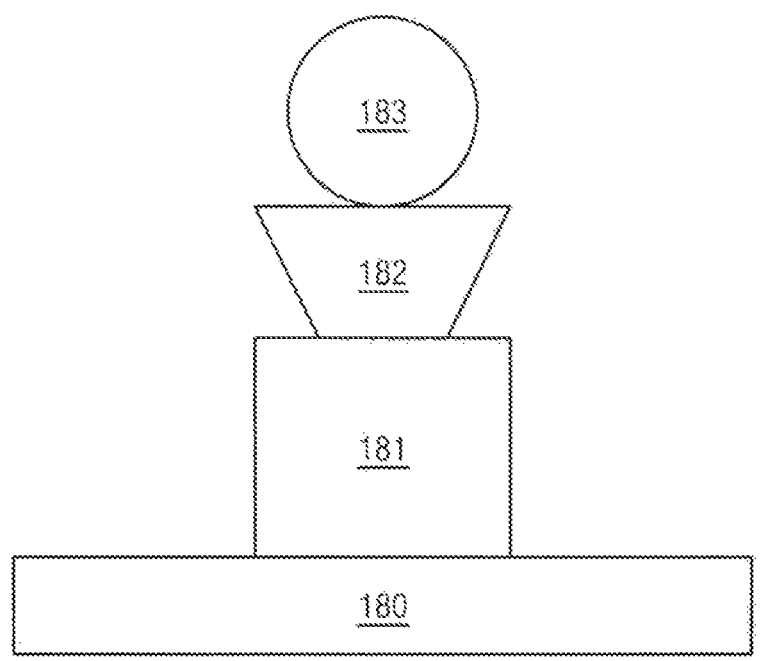

According to another aspect of the present disclosure, the user may be shown a series of actions (or procedure), after which the user is prompted to repeat those actions. This idea is illustrated in FIGS. 4 and 5. Referring to FIG. 4, an original screenshot presented to the user is a structure 165 that contains a plurality of openings 166-169. The opening 166-169 are located at the top, bottom, left, and right of the structure 165, respectively. Also shown in the screenshot is a plurality of media components 170-178 that are located within the structure 165. The media components 170-178 may have different shapes, colors, or sizes from one another. The media components 170-178 are balls (shown as circles) in the embodiment illustrated in FIG. 4, but they may have different shapes in alternative embodiments, for example triangles or squares.

The following series of actions may be demonstrated to the user: a finger (an image of a finger) touches one of the media components 170-178, for example the media component 173, and subsequently drags the media component 173 out of one of the openings 166-169, for example the opening 166 at the top of the structure 165. The media component 173 may be a yellow ball in this embodiment, whereas the rest of the media components are balls of different colors. The screen is then reset. In an embodiment, the media components 170-178 return to the same previous locations and have the same sizes, shapes, and colors. In an alternative embodiment, the media component 170-178 may be placed in different locations than in the previous screen and may have different sizes, shapes, or colors. The openings may be moved to different locations as well (for example, the top opening 166 may be shifted to its right by a certain distance). These changes may be implemented to enhance the difficulty of automation by a machine.

The user is prompted to repeat the course of actions previously demonstrated. The prompting of the user may be performed through an instructions object (not illustrated herein) which may read, "repeat the previous series of actions." A human user watching the previously demonstrated series of actions will understand that he is supposed to drag a yellow ball out of the top opening, even if the yellow ball is not necessarily at the same location as before, and the location of the top opening has been altered slightly.

On the other hand, this task is much more difficult for the machine to perform. First, it may be quite difficult for a machine to detect the demonstrated series of actions. Second, even if the machine can correctly detect the demonstrated actions, it may not correctly decipher the instructions. And lastly, even if a machine can detect that the actions involve moving a round yellow object from location A to location B, and that the task is to "repeat" these actions, the machine may not know how to properly "repeat" this procedure if the yellow ball (and/or the top opening) is no longer at the same location. For example, a red ball may be located at the yellow ball's previous location, whereas the yellow ball is now located elsewhere. The machine may be forced to make a difficult choice as to whether "repeating" the procedure entails moving the red ball (because it is where the previous object used to be) out of the top opening, or whether it entails moving the yellow ball (now located elsewhere) out of the top opening. Stated differently, even an "intelligent" machine that can detect the demonstrated procedure and decipher the instructions may still not be able to perform the task correctly, whereas a human user can do this with ease.

FIG. 5 is another illustration of a concept similar to that discussed above in association with FIG. 4. Referring to FIG. 5, an original screenshot shown to the user includes a plurality of media components 180-183 stacked on top of one another. In the illustrated embodiment, at the bottom of the stack is the media component 180, which is a rectangle in the illustrated embodiment. The media component 181 stacked on top of the media component 180 is a square in the illustrated embodiment. The media component 182 stacked on top of the media component 181 is a trapezoid in the illustrated embodiment. The media component 183 stacked on top of the media component 182 is a circle in the illustrated embodiment.

An instructions object (not illustrated herein) may contain instructions that prompt the user to memorize the stacking scheme formed by the media components 180-183. When the user is ready, the media components 180-183 are dispersed, and the user is instructed to assemble the media component 180-183 according to the stacking scheme shown in FIG. 5. Once again, this task should be relatively easy for a user, but it may be difficult for a machine to solve.

It is understood that the user may accomplish the navigation of the media components discussed above using his finger(s) on a touch-screen device. Alternatively, the user may use a mouse or a keyboard. For example, one of the objects may be initially highlighted. Pressing the "Tab" button on a keyboard may move the highlight cursor to another object, and pressing the directional arrow keys on the keyboard may move that highlighted object in the direction corresponding to the directional arrow key.

Figure 6:
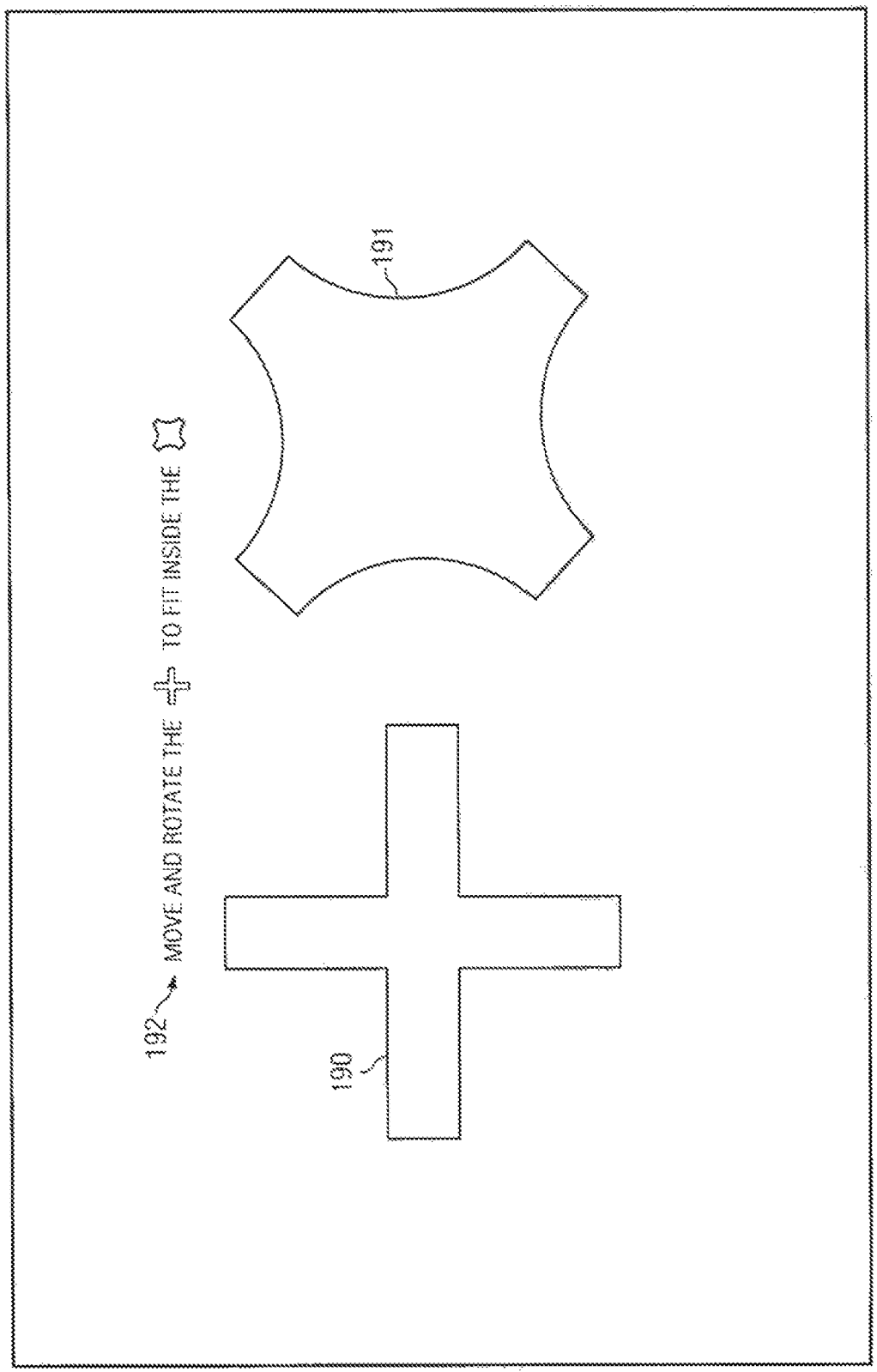

According to another aspect of the present disclosure, the user may be asked to manipulate one media component relative to (or with respect to) another media component. Referring to FIG. 6, two media components 190 and 191 are illustrated. An instructions object 190 displays instructions that prompt the user to move and/or rotate one of the media components so that it can fit inside the other media component. In the illustrated embodiment, the media component 190 must be rotated by a particular angle (or in a particular range of angles) before it can fit inside the media component 191. In some embodiments, the user may need to resize one of the media components to accomplish this task. It is understood that the media components 190-191 illustrated herein are merely examples, and that alternative shapes, sizes, and rotation angles may be randomly generated in other embodiments to enhance the difficulty of automation.

Figure 7:
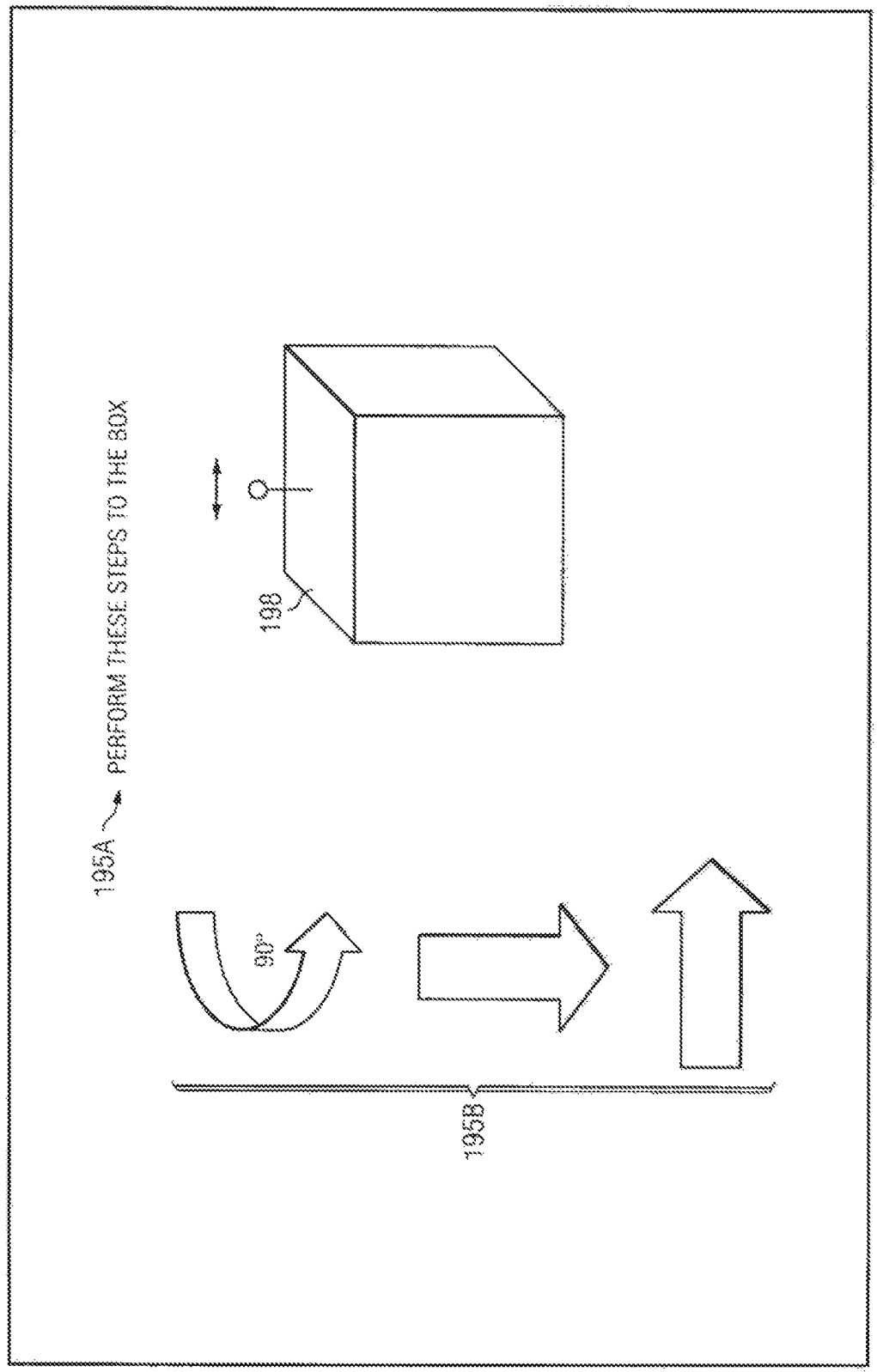

According to yet another aspect of the present disclosure, instructions may be presented graphically (in addition to or instead of textually) to the user as well, in part to further enhance the difficulty of automation by machines. Referring to FIG. 7, an instructions object includes a textual component 195A and a graphical component 195B. The textual component 195A reads, "Perform these steps to the box." The graphical component 195B graphically illustrates a rotational arrow sign with a corresponding text "90°", a downward directional arrow sign, and a right directional arrow sign. Also illustrated in FIG. 7 is a media component 198 that is a box in the illustrated embodiment. A human user may quickly understand that according to the graphical component 195B, he is supposed to rotate the box by 90 degrees, and then move the box downward, and then move the box to the right. But once again, a machine may have a difficult time comprehending the instructions (particularly since the instructions are graphical in nature) and therefore will likely fail the CAPTCHA.

A user may perform the tasks through a plurality of suitable mechanisms. In one embodiment, the user performs the tasks on a touch-screen according to the displayed instructions. In another embodiment, the user may perform the tasks using a joystick. In yet another embodiment, the user may perform the tasks using a mouse or another suitable pointing device. In another embodiment, the user may perform the tasks using an eyeball-tracker. In other embodiments, the user may perform the tasks through a voice command system.

A description of the user's actions is obtained by the server. For example, through a touch-screen display, movement of the user's fingers on the screen can be detected. The movement may include clicking, dragging, pinching, and/or circling. In other embodiments, the user may manipulate objects using an accelerometer, for example by physically moving or rotating a handheld device. Based on the detected user actions (e.g., finger movement on a screen), the server can identify the objects the user attempted to manipulate. Given the description of the user's actions, the server can determine whether the user's actions correspond with the instructions well enough to satisfy a predetermined threshold, and accordingly whether or not to grant the user's request.

The predetermined threshold may be implemented differently in different embodiments. For example, in one embodiment, the threshold may be "did the outer boundary of the boat touch the outer boundary of the dog at the end of the dragging motion?" In other embodiments, the predetermined threshold may be set up so that the two media components need not actually touch each other, but as long as they are dragged to be within a small distance (e.g., 1 millimeter), then that may satisfy the threshold. In other words, the verification of the user can be exact—when the task is solved perfectly. The verification of the user can be fuzzy—when the task is solved sufficiently well, but not perfectly.

The threshold may also be dynamically adjusted based on the situation in which a request is made (e.g., high dollar value transaction or low dollar value transaction?) or on past performance of the account (e.g., did the user make identical or similar requests repeatedly in the past?), and/or computer data and IP address range (e.g., based on the user's location corresponding to the IP address, does the user's request appear suspicious?).

It is understood that the CAPTCHA disclosed herein may also be adapted to filter out (or conversely, be confined to) particular types of users. As an example, the server may generate media components that children are familiar with, such as characters from popular children's shows. The instructions may be given in an audio manner. As such, children who cannot read or write may still be able to pass the CAPTCHA test and be verified as a legitimate human user. On the other hand, if the CAPTCHA is supposed to only pass users older than a particular age, then the user is asked to identify things that are only recognized by users of a certain age, for example things that can be found in an office. Most children who have not been to an office will not be able to identify the objects in an office and thus will likely fail the CAPTCHA test. As another example, the user may be asked to identify things that cost less than $20 each. Children who have no experience paying bills will likely fail this test as well.

In recent years, fraudsters have also relied on outsourcing to solve CAPTCHAs. For example, human labor can be hired in low wage countries to perform CAPTCHA solving tasks. The CAPTCHA disclosed herein can also be adapted to defeat such outsourcing (or at least reduce the likelihood of its success) by making the tasks culturally or geographically relevant. For example, if the CAPTCHA is aimed at verifying users of a particular country like the United States, the CAPTCHA may display images of famous athletes of different sports (e.g., Michael Jordan for basketball or Joe Montana for football) as well as representations of these sports (e.g., a basketball hoop or a football field) and ask the user to match the athletes to their sports. Even human users from a foreign country may have a difficult time performing this task correctly, since they may not be familiar with these athletes who are famous in the United States.

As another example, the CAPTCHA may play a tune from a well-known nursery rhyme in a given country or region and ask the user to pick a media component (for example an image) that relates to the nursery rhyme. For instance, the tune from "London Bridge is falling down" may be played, and an image of a bridge may be displayed as one of the many media components. If the user clicks on the image of the bridge, he may be verified. Outsourced human labor may also encounter difficulty trying to solve these tasks because they likely have not been exposed to these nursery rhymes from other countries.

As yet another example, among other things, the CAPTCHA may display a landmark or an item that is famous to users of a particular region, and ask the user to identify these landmarks or items. Such tasks will once again be difficult for outsourced human labor to solve, provided that they are not from that particular region.

Using another example, the CAPTCHA may also be fine-tuned to (or zeroed-in on) a specific human user. The CAPTCHA may be generated according to that specific human user's history or preferences. For example, the CAPTCHA may ask the user to "click on all images representing products you have recently bought on this site" or "click on all images that you have previously seen on this site." In this manner, only a targeted human user will likely pass the verification test.

In each of the examples discussed above, the solving of the tasks requires relevant context, which the desired types of human users have but machines or other types of human users do not.

The embodiments of the CAPTCHA disclosed herein offer advantages over conventional CAPTCHAs, it being understood that other embodiments may offer different advantages, and that no particular advantage is required for all embodiments. One advantage is that the CAPTCHA disclosed herein is much harder for machines to solve. Conventional CAPTCHAs often rely on obfuscated words alone to thwart a machine attack. However, as Optical Character Recognition (OCR) technologies continue to advance, machines have become more versatile and more capable of identifying fairly obfuscated words. In comparison, the CAPTCHA disclosed herein utilizes media content such as images that each represent an underlying item or concept. Each item or concept may have thousands of different manifestations in images, audios, or videos. Thus, it is much harder for a machine to correctly associate the media content with the item or concept that it represents. And as discussed above, the images or other types of media content can be obfuscated (e.g., overlapped, fuzzed, partially hidden, etc.) to make their identification even more difficult for a machine.

Another advantage is that by having a plurality of different media components, the CAPTCHA herein is much more difficult to solve by a machine from a mathematical standpoint. For example, if there are two instructions and fifteen media components, then there are 15*14*13*12=32760 different permutations of tasks (assuming no identical repeat tasks). As such, there is only a 1/32760 chance for a machine to randomly solve the CAPTCHA correctly. As the number of instructions and/or the number of media components increase, the number of permutations of tasks increases as well, thereby reducing the likelihood that a machine can randomly solve the CAPTCHA correctly.

Another advantage of the CAPTCHA disclosed herein is that it is user-friendly, particularly if the user is using a relatively small display screen, for example a mobile handset device. With conventional types of CAPTCHAs, the obfuscated words displayed on a small screen may make them hard for the human user to recognize. Even if the user can correctly recognize the words, it may still be inconvenient for the user to input them using a handset device with a small keyboard or no keyboard. This may lead to a frustrating verification experience for the user. In comparison, the media-based CAPTCHA disclosed herein allows the users to easily identify the media components even on a small screen, because the media components represent common things that the user is familiar with. The CAPTCHA disclosed herein also allows the user to easily maneuver the media components using fingers (e.g., by dragging, clicking, pinching, or circling) or another suitable input mechanism according to the instructions given, thereby obviating an awkward inputting experience.

The CAPTCHA disclosed herein also offers the advantage of reducing the probability of success of solving CAPTCHAs through outsourced human labor. As discussed above, the CAPTCHAs herein can be designed and implemented to be culturally and/or geographically relevant, which make them hard to solve for even human users from a different region. In some cases, the CAPTCHA disclosed herein is also designed for a specific user based on his contextual information such as his purchasing history, thereby enhancing the security level of the CAPTCHA even further.

Figure 8:
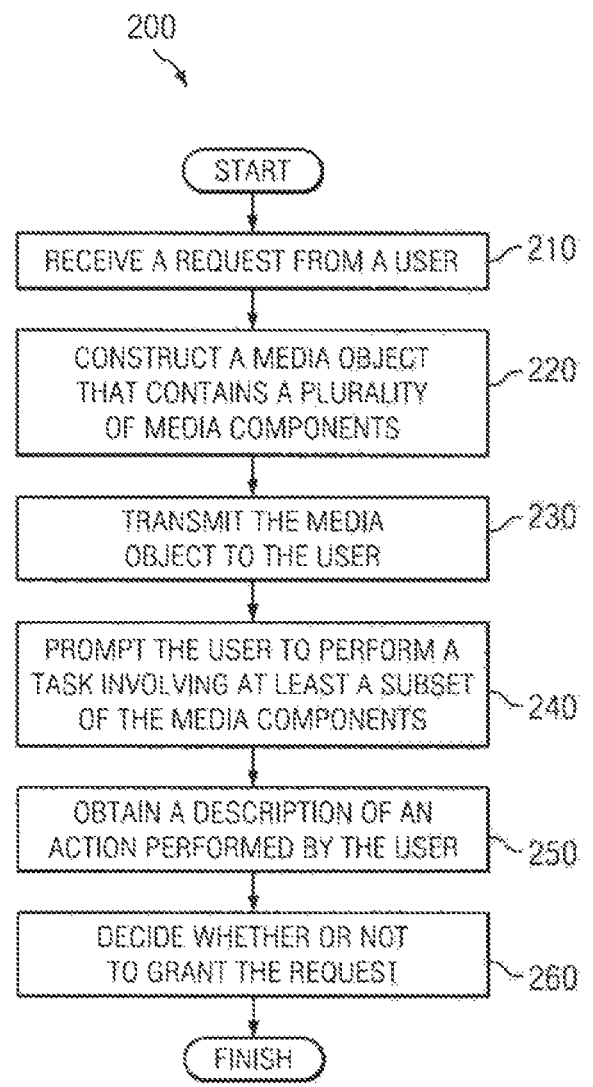
FIG. 8 illustrates a flowchart of verifying a user through a CAPTCHA according to various aspects of the present disclosure.

FIG. 8 is a flowchart illustrating a method 200 for utilizing a CAPTCHA to verify a user according to various aspects of the present disclosure. The method 200 includes block 210 in which a request is received from a user. The user may be a human or a machine. The method 200 includes block 220 in which a media object is constructed by a computer processor. The media object has at least one of the following characteristics: a visual characteristic, an audio characteristic, and a tactile characteristic. The media object contains a plurality of media components. In an embodiment, at least some of the media components may be obfuscated. In an embodiment, at least some of the media components may be randomly generated. In an embodiment, at least some of the media components are relevant to the user's culture or the user's geographical location. In an embodiment, each media component is a representation of a man-made device or an item that exists in nature.

The method 200 includes block 230 in which the media object is transmitted to the user. The transmission of the object may include displaying the media object on a mobile device such as a mobile handset device. The method 200 includes block 240 in which the user is prompted to perform a task involving at least a subset of the media components. The task includes at least one of the following: clicking on each of the media components in the subset according to a predefined sequence; and modifying at least one of the media components in the subset with respect to at least one of its following properties: location, size, appearance, and orientation. The block 240 may be carried out using obfuscated instructions. The method 200 includes block 250 in which a description of an action performed by the user is obtained in response to block 240. The description of the user's actions may be obtained by detecting at least one of the following: detecting a clicking motion, detecting a dragging motion, detecting a pinching motion, and detecting a circling motion.

The method 200 includes block 260 in which a server decides whether or not to grant the request based on block 250. The server may make the decision based on an evaluation of whether the description of the action corresponds to the task well enough to satisfy a predetermined threshold. One or more of the actions in blocks 210-260 may be performed using a computer hardware device encoded with software instructions.

Figure 9:
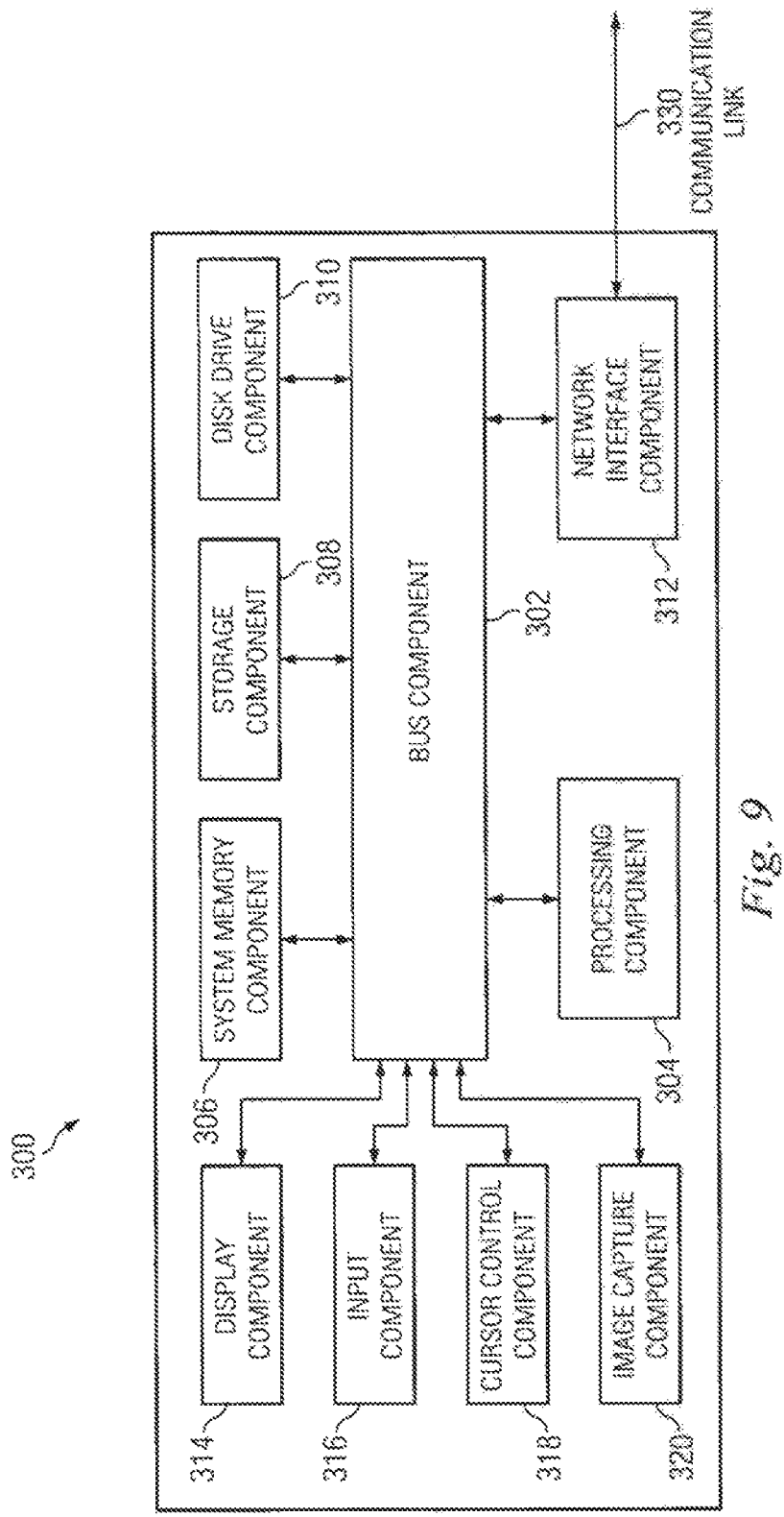
FIG. 9 shows a block diagram of a computer system for implementing various methods and devices described according to various aspects of the present disclosure.

FIG. 9 is a block diagram of a computer system 300 suitable for implementing various methods and devices described herein, for example, the various method blocks of the method 200. In various implementations, user devices may comprise a network communications device (e.g., mobile cellular phone, laptop, personal computer, etc.) capable of communicating with a network, and a service provider device (such as managed by a third party payment platform) may comprise a network computing device (e.g., a network server). In other implementations, it should be appreciated that the service provider device may comprise a network communications device (e.g., mobile cellular phone, laptop, personal computer, etc.) capable of communicating with the network, without departing from the scope of the present disclosure. Accordingly, it should be appreciated that each of the devices may be implemented as the computer system 300 for communication with the network in a manner as follows.

In accordance with various embodiments of the present disclosure, the computer system 300, such as a mobile communications device and/or a network server, includes a bus component 302 or other communication mechanisms for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., cathode ray tube (CRT) or liquid crystal display (LCD)), input component 316 (e.g., keyboard), cursor control component 318 (e.g., mouse or trackball), and image capture component 320 (e.g., analog or digital camera). In one implementation, disk drive component 310 may comprise a database having one or more disk drive components.

In accordance with embodiments of the present disclosure, computer system 300 performs specific operations by processor 304 executing one or more sequences of one or more instructions contained in system memory component 306. Such instructions may be read into system memory component 306 from another computer readable medium, such as static storage component 308 or disk drive component 310. In other embodiments, hard-wired circuitry may be used in place of (or in combination with) software instructions to implement the present disclosure.

Logic may be encoded in a computer readable medium, which may refer to any medium that participates in providing instructions to processor 304 for execution. Such a medium may take many forms, including but not limited to, non-volatile media and volatile media. In one embodiment, the computer readable medium is non-transitory. In various implementations, non-volatile media includes optical or magnetic disks, such as disk drive component 310, and volatile media includes dynamic memory, such as system memory component 306. In one aspect, data and information related to execution instructions may be transmitted to computer system 300 via a transmission media, such as in the form of acoustic or light waves, including those generated during radio wave and infrared data communications. In various implementations, transmission media may include coaxial cables, copper wire, and fiber optics, including wires that comprise bus 302.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 330 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory; and
    one or more hardware processors coupled to the non-transitory memory and configured to read instructions from the non-transitory memory to cause the system to perform operations comprising:
        receiving a request from a user device;
        generating obfuscated instructions to be presented on the user device;
        constructing a media object that contains a plurality of media components that interact with each other and create a solvable puzzle, wherein the solvable puzzle is culturally relevant to a determined country associated with the user device;
        transmitting the media object and the obfuscated instructions to the user device for display;
        transmitting media instructions on how to solve the solvable puzzle and a prompt to solve the solvable puzzle to the user device for display;
        receiving a description of an action performed by a user on the user device in response to the prompt;
        determining, based on the description of the action performed by the user, that the user is human; and
        granting the request in response to determining that the user is human.

2. The system of claim 1, wherein solving of the solvable puzzle comprises a correct association of an image with a sound.

3. The system of claim 1, wherein granting the request is further in response to determining that the user is from the determined country.

4. The system of claim 3, wherein the determined country is based on an IP address associated with the user device.

5. The system of claim 3, wherein determining that the user is from the determined country is based on the description of the action performed by the user.

6. The system of claim 1, wherein the receiving the description of the action comprises receiving an indication that the user has interacted with one or more of the media component by touching the one or more of the media components with a finger of the user.

7. The system of claim 1, wherein at least one of the media components is obfuscated.

8. The system of claim 1, wherein the at least one of the media components that is obfuscated is a moveable component for solving the solvable puzzle.

9. A non-transitory computer-readable medium having stored thereon machine-readable instructions that, in response to being executed by a system, cause the system to perform operations comprising:
receiving a request from a user device of a user;
generating obfuscated instructions to be presented on the user device;
constructing a media object that contains a plurality of media components that interact with each other and create a solvable puzzle, wherein the at least one of the media components is obfuscated and is culturally relevant to a country associated with the user;
transmitting the media object and the obfuscated instructions to the user device for display;
transmitting media instructions on how to solve the solvable puzzle and a prompt to solve the solvable puzzle to the user device for display;
receiving a description of an action performed by the user on the user device in response to the prompt;
determining, based on the description of the action performed by the user, that the user is human; and
granting the request in response to determining that the user is human.

10. The non-transitory computer-readable medium of claim 9, wherein the at least one of the media components that is obfuscated is a moveable component for solving the solvable puzzle.

11. The non-transitory computer-readable medium of claim 10, wherein the solvable puzzle is solved by a correct association of an image with a sound.

12. The non-transitory computer-readable medium of claim 9, wherein the granting of the request is further in response to determining that the user is from the country.

13. The non-transitory computer-readable medium of claim 12, wherein determining that the user is from the country is based at least in part on the description of the action performed by the user.

14. The non-transitory computer-readable medium of claim 13, wherein the system determines whether the user correctly solved the solvable puzzle based on the description of the action performed by the user.

15. A computer implemented method, comprising:
receiving a request from a user device of a user;
generating obfuscated instructions to be presented on the user device;
constructing a media object that contains a plurality of media components that interact with each other and create a solvable puzzle, wherein the solvable puzzle is culturally relevant to a location determined for the user;
transmitting the media object and the obfuscated instructions to the user device for display;
transmitting media instructions on how to solve the solvable puzzle and a prompt to solve the solvable puzzle to the user device for display;
receiving a description of an action performed by the user on the user device in response to the prompt;
determining, based on the description of the action performed by the user, that the user is human; and
granting the request in response to determining that the user is human.

16. The method of claim 15, wherein at least one of the media components is a moveable component for solving the solvable puzzle.

17. The method of claim 16, wherein the determining that the user is human is based at least in part on determining that the user correctly solved the solvable puzzle.

18. The method of claim 15, wherein the solvable puzzle is solved by a correct association of an image with a sound.

19. The method of claim 15, wherein the location is determined based on an IP address associated with the user device.

20. The method of claim 16, wherein the moveable component for solving the solvable puzzle is culturally relevant to the location.

* * * * *